US007121257B2

(12) United States Patent
Dölker

(10) Patent No.: US 7,121,257 B2
(45) Date of Patent: Oct. 17, 2006

(54) METHOD FOR THE AUTOMATIC CONTROL OF AN INTERNAL COMBUSTION ENGINE-GENERATOR UNIT

(75) Inventor: Armin Dölker, Immenstaad (DE)

(73) Assignee: MTU Friedrichshafen GmbH, Friedrichshafen (DE)
n ( * ) Notice: Subject to any disclaimer, the term of this patent is extended or adjusted under 35 U.S.C. 154(b) by 6 days.

(21) Appl. No.: 11/096,794

(22) Filed: Apr. 1, 2005

(65) Prior Publication Data

US 2005/0217640 A1 Oct. 6, 2005

(30) Foreign Application Priority Data

Apr. 1, 2004 (DE) ..................... 10 2004 015 973

(51) Int. Cl.
*F02D 41/14* (2006.01)
*H02P 9/00* (2006.01)

(52) U.S. Cl. ...................................... 123/352; 123/436

(58) Field of Classification Search ................ 123/352, 123/299–300, 304, 305, 436, 492–494, 480, 123/2–3; 701/103–105, 110; 290/40 A, 290/40 R, 51, 30 A
See application file for complete search history.

(56) References Cited

U.S. PATENT DOCUMENTS

| | | | | |
|---|---|---|---|---|
| 6,397,821 | B1 | 6/2002 | Spägele et al. | |
| 6,994,074 | B1 * | 2/2006 | Doelker | 123/319 |
| 7,021,293 | B1 * | 4/2006 | Dolker | 123/486 |
| 2005/0253394 | A1 * | 11/2005 | Dolker et al. | 290/30 A |

FOREIGN PATENT DOCUMENTS

| | | | |
|---|---|---|---|
| DE | 199 37 139 | C1 | 4/2001 |
| DE | 103 02 263 | B3 | 3/2004 |

* cited by examiner

*Primary Examiner*—Hai Huynh
(74) *Attorney, Agent, or Firm*—Klaus P. Stoffel; Wolff & Samson, PC

(57) ABSTRACT

A method for automatically controlling an internal combustion engine-generator unit, in which, in a generator installation with closed-loop load equalization control, a speed limitation curve can be varied as a function of a speed set value (nM(SL)).

10 Claims, 4 Drawing Sheets

METHOD FOR THE AUTOMATIC CONTROL OF AN INTERNAL COMBUSTION ENGINE-GENERATOR UNIT

BACKGROUND OF THE INVENTION

The invention concerns a method for the automatic control of an internal combustion engine-generator unit.

An internal combustion engine provided as a generator drive is usually operated in a closed-loop speed control system. The actual speed of the crankshaft is determined as the controlled value. It is compared with a reference input, i.e., a set speed. The resulting control deviation is converted by a speed controller to the correcting variable, e.g., a set injection quantity. To stabilize the closed-loop speed control system, a one-revolution or two-revolution filter is provided in the feedback path.

An internal combustion engine of this type is operated in a steady state, i.e., at a constant rated speed. For example, a rated speed of 1,500 rpm corresponds to a power frequency of 50 Hz in a generator application. Due to external influences, a dynamic operating state can arise, for example, in the case of a load rejection. Applicable industrial standards (DIN, VDE) define acceptable speed increases in the event that a dynamic operating state develops, for example, 10% of the rated speed.

DE 199 37 139 C1 describes a method for the automatic control of an internal combustion engine-generator unit, in which the injection start is shifted towards late when a significant load reduction on the power takeoff is detected. A speed limitation curve for limiting the set injection quantity is provided in the injection start input-output map as an additional measure. However, the speed limitation curve restricts the adjustment range in steady-state operation.

DE 103 02 263 B3 describes a method in which the set injection quantity in steady-state operation is limited by means of a first speed limitation curve. This does not take effect until the actual speeds are significantly higher than the rated speed. Consequently, this provides the operator a large adjustment range of the set speed in the steady state. When a dynamic operating state is detected, a changeover is made to a second speed limitation curve, by which the set injection quantity and thus the actual speed are limited.

A generator installation often comprises several internal combustion engine-generator units operating in parallel. A closed-loop load equalization control system ensures that different internal combustion engines produce identical outputs. A higher output is adjusted by the operator by increasing a speed set value. The closed-loop load equalization control system consists in initially allowing an increased set injection quantity on the basis of the higher speed set value and the higher control deviation. A speed controller with an increased set injection quantity as the correcting variable also has a higher integral component. The integral component is converted to a correction speed. A P-degree that can be preset by the operator is critical for this conversion. The correction speed and the speed set value are then used to compute an effective set speed, which, together with the actual speed, is critical for the closed-loop speed control. Since the correction speed is reduced with a rising integral component, the effective set speed falls back to the rated speed, while the set injection quantity remains at the higher level. A higher set injection quantity causes a higher power output of the internal combustion engine.

When the prior-art methods are used, the following problem arises in practice in conjunction with closed-loop load equalization control:

During a load rejection, the actual speed rises very fast. As a result of this, the set injection quantity is reduced by the speed controller. An especially strong reduction of the set injection quantity and the integral-action component occurs when these are limited by the speed limitation curve. An increasing correction speed is computed by the closed-loop load equalization control system due to the falling integral-action component. At a constant speed set value, a higher correction speed means a higher effective set speed. A higher effective set speed causes a smaller speed control deviation. The effect of this is that the limitation of the set injection quantity by the speed limitation curve is deactivated again. Therefore, in the case of a load rejection, the actual speed of the internal combustion engine can overshoot by an unacceptably large amount. Therefore, the prior-art methods are of limited usefulness in a generator installation with closed-loop load equalization control.

SUMMARY OF THE INVENTION

The object of the present invention is to improve the previously known automatic control methods with respect to closed-loop load equalization control for an internal combustion engine-generator unit.

The invention provides that the speed limitation curve can be varied as a function of the speed set value. An increase in the speed set value causes a shift of the speed limitation curve to higher actual speeds. The speed limitation curve shifts with the speed set value. In a refinement of the inventive method, it is proposed that a speed regulation curve of the speed limitation curve can be varied via the P-degree.

The advantages of the invention are that the criteria established in the industrial standards (DIN, VDE) for the load rejection are reliably satisfied. The speed adjustment range in steady-state operation likewise meets the requirements of the industrial standard (DIN). Since the parameters of the speed controller can now be established independently of the load rejection behavior, the load rejection behavior is easier to adjust. This allows a robust design of the speed controller.

Other features and advantages of the present invention will become apparent from the following description of the invention that refers to the accompanying drawings.

DETAILED DESCRIPTION OF THE INVENTION

Figure 1:
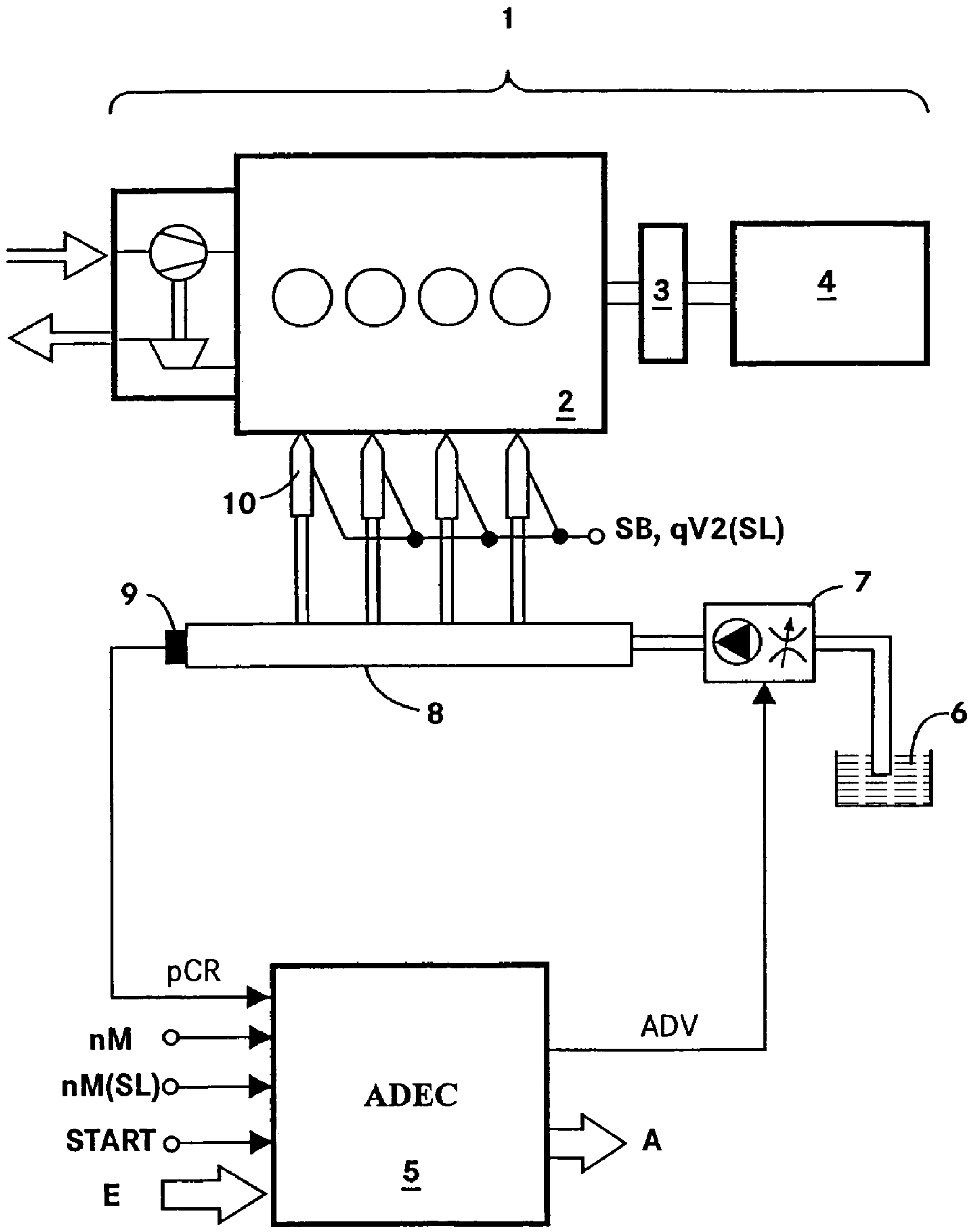
FIG. 1 shows a system diagram.

FIG. 1 shows a system diagram of the total system of an internal combustion engine-generator unit 1, which consists of an internal combustion engine 2 with a generator 4. The internal combustion engine 2 drives the generator 4 via a shaft and coupling 3. The illustrated internal combustion engine 2 has a common-rail injection system. This injection system comprises the following components: pumps 7 with a suction throttle for conveying the fuel from a fuel tank 6, a rail 8 for storing the fuel, and injectors 10 for injecting the fuel from the rail 8 into the combustion chambers of the internal combustion engine 2.

The internal combustion engine is automatically controlled by an electronic control unit (ADEC) 5. The electronic control unit 5 contains the usual components of a microcomputer system, for example, a microprocessor, interface adapters, buffers, and memory components (EEPROM, RAM). The relevant operating characteristics for the operation of the internal combustion engine 2 are applied in the memory components in input-output maps/characteristic curves. The electronic control unit 5 uses these to compute the output variables from the input variables. FIG. 1 shows the following input variables as examples: a rail pressure pCR, which is measured by means of a rail pressure sensor 9, a speed signal nM of the internal combustion engine 2, a signal START for activating the internal combustion engine-generator unit 1, a speed set value nM(SL) for the set-point assignment by the operator, and an input variable E. Examples of input variables E are the charge air pressure of a turbocharger and the temperatures of the coolant/lubricant and the fuel.

As output variables of the electronic control unit 5, FIG. 1 shows a signal ADV for controlling the pumps 7 with a suction throttle and an output variable A. The output variable A is representative of the other control signals for automatically controlling the internal combustion engine 2, for example, the injection start SB and a second set injection quantity qV2(SL).

Figure 2:
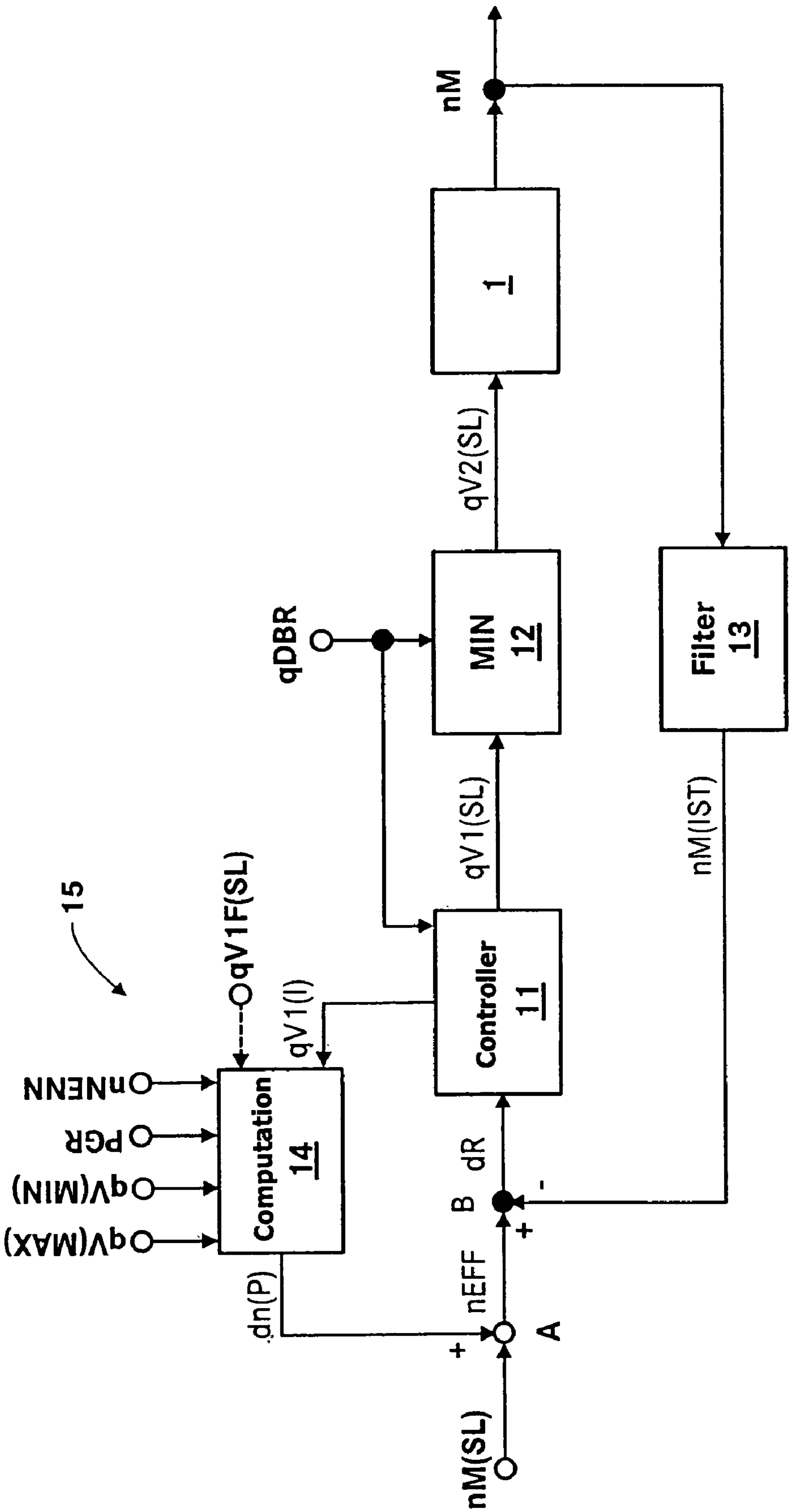
FIG. 2 shows a functional block diagram.

FIG. 2 shows a functional block diagram, which contains a closed-loop speed control system and a closed-loop load equalization control system. The closed-loop speed control system consists of a speed controller 11, a minimum value selection unit 12, the controlled system, which in the present case is the internal combustion engine-generator unit 1, and a filter 13. A first set injection quantity qV1(SL) is computed as a correcting variable by the speed controller 11 as a function of the control deviation dR. The first set injection quantity qV1(SL) is limited by the minimum value selection unit 12. To this end, a limit injection quantity qDBR is supplied to the minimum value selection unit 12. The limit injection quantity qDBR is determined by a speed limitation curve DBR. The limit injection quantity qDBR is also supplied to the speed controller 11. The output variable of the minimum value selection unit 12, which is a second set injection quantity qV2(SL), is then supplied to the controlled system. The value of the second set injection quantity qV2(SL) corresponds either to the value of the first set injection quantity qV1(SL) or to the value of the limit injection quantity qDBR. The raw values of the speed nM are acquired as the output variable of the controlled system. These raw values are converted to an actual speed nM(IST) by the filter.

The closed-loop speed control system is supplemented by a closed-loop load equalization control system 15. For this purpose, the integral-action component qV1(I) of the first set injection quantity qV1(SL) is supplied to a functional block 14. A correction speed dn(P) is determined by the functional block 14 as a function of input variables. The input variables of the functional block 14 are a maximum injection quantity qV(MAX), a minimum injection quantity qV(MIN), the P-degree PGR, and a rated speed nNENN, which is typically 1,500 rpm in a 50 Hz generator application. These input variables can be supplemented by a filtered first set injection quantity qV1F(SL). This supplementary input is indicated by a broken line. The correction speed dn(P) is added to the speed set value nM(SL) at a point A. The speed set value nM(SL) is preset by the operator of the generator installation. This yields an effective set speed nEFF. The actual speed nM(IST) is subtracted from the effective set speed nEFF at a point B. The difference corresponds to the control deviation dR.

The block diagram depicts the following functionality:

To achieve load equalization of the internal combustion engine-generator unit, the speed set value nM(SL) is increased, e.g., from 1,440 rpm to 1,450 rpm. At this time, the correction speed dn(P) is 60 rpm. The effective set speed nEFF thus corresponds to the rated speed nNENN. At a constant actual speed nM(IST), the higher speed set value nM(SL) results in a higher control deviation dR, which is converted to a higher first set injection quantity qV1(SL) by the speed controller 11. A higher first set injection quantity qV1(SL) causes a greater amount of fuel to be injected into the combustion chambers of the internal combustion engine. The integral-action component qV1(I) computed by the speed controller 11 is converted by the functional block 14 to the correction speed dn(P). An increasing integral-action component qV1(I) causes a decreasing correction speed dn(P). Therefore, the speed set value nM(SL) is added to a decreasing correction speed dn(P). The correction speed dn(P) is reduced by the functional block 14 until the effective speed nEFF is returned to the original rated speed level of 1,500 rpm. Due to the feedback, this return occurs with a time delay. As a consequence, a control deviation of zero finally develops, so that the internal combustion engine-generator unit is automatically controlled back to the original rated speed value. Since the integral-action component qV1(I) remains at the higher value, more fuel is injected, despite the same rated speed. The power output of the internal combustion engine is thus increased.

Figure 3:
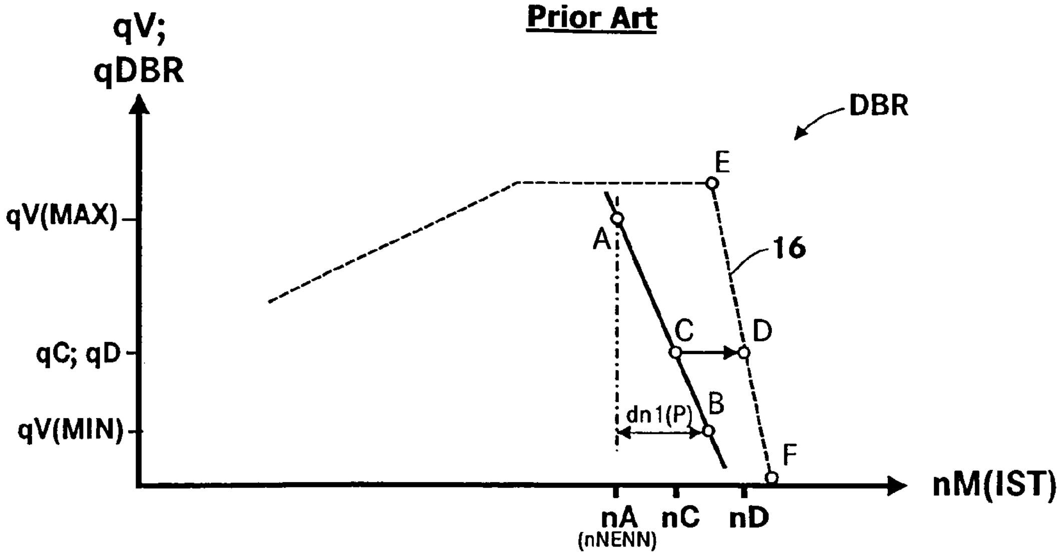
FIG. 3 shows a speed limitation curve (state of the art)

FIG. 3 shows a speed limitation curve DBR in accordance with the state of the art. The speed limitation curve DBR limits the first set injection quantity qV1(SL). The actual speed nM(IST) is plotted on the x-axis, and the injection quantity qV or the limit injection quantity qDBR is plotted on the y-axis. The speed limitation curve DBR is plotted as a broken line in this diagram. An operating point A is defined by the pair of values qV(MAX) and nA or nNENN. The operating point A corresponds to the operation of the internal combustion engine-generator unit at full load and a rated speed nNENN of. e.g., 1,500 rpm. An operating point C is defined by the pair of values nC and qC. Due to a load rejection, the actual speed nM(IST) increases from operating point C towards point D. Point D lies on the speed limitation curve DBR. When the speed value nD is exceeded, the injection quantity qV is reduced along the speed limitation curve DBR, starting from qC or qD. The first set injection quantity qV1(SL) computed by the speed controller 11 is limited by the minimum value selection unit 12 (see FIG. 2) to the limit injection quantity qDBR on the basis of the speed limitation curve DBR.

For the load rejection, industrial standards (DIN, VDE) provide that the actual speed nM(IST) may overshoot the rated speed by a maximum of 10 to 15%. The P-degree in these application groups (G1 to G3) is in the range of 3% to 8%. At the same time, the industrial standards specify that the speed adjustment range of the speed set value in the steady state should be greater than or equal to 2.5% of the rated speed. For the manufacturer of the internal combustion engine, this means that a speed regulation curve 16 of the speed limitation curve DBR must be selected in such a way that the load rejection criteria are reliably met. The speed regulation curve 16 of the speed limitation curve DBR corresponds to the falling linear segment between the points E and F. For example, at a rated speed of 1,500 rpm, point E has a value of 1,575 rpm, and point F has a value of 1,630 rpm. In steady-state operation, the speed adjustment range is sharply restricted by this fixed speed limitation curve DBR at large P-degrees, i.e., the required adjustment range of at least 2.5% of the rated speed cannot be maintained.

In FIG. 3, the solid line through the points A and B characterizes the steady-state operating points of a generator installation with closed-loop load equalization control if this is operated individually. The deviation of the speed values on the line AB from the rated speed nNENN is identical to the correction speed dn(P). At the full-load point A, the correction speed dn(P) is equal to zero, and in idling operation (point B), the correction speed dn(P) reaches a maximum. The correction speed dn1(P) of the idling operation is preset by the operator and is, specified in percent of the rated speed nNENN, identical to the P-degree PGR.

When the prior-art methods are used, the following problem arises in practice in conjunction with closed-loop load equalization control:

During a load rejection, the actual speed nm(IST) rises very fast, and as a result of this, the first set injection quantity is reduced by the speed controller. An especially strong reduction of the first set injection quantity and the integral-action component of the speed controller occurs when the first set injection quantity is limited by the speed limitation curve DBR. An increasing correction speed is computed by the closed-loop load equalization control system due to the falling integral-action component. At a constant speed set value, a higher correction speed means a higher effective set speed. With increasing actual speed, a higher effective set speed causes a smaller control deviation. The effect of this is that the first set injection quantity qV1(SL) becomes smaller than the limit injection quantity qDBR, i.e., the speed limitation curve DBR is no longer effective.

Figure 4:
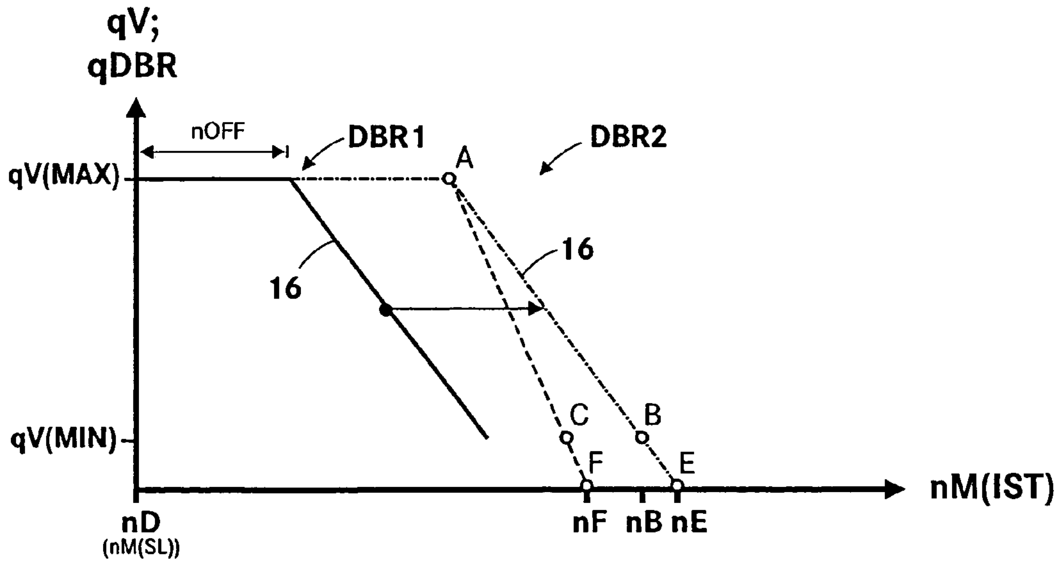
FIG. 4 shows a speed limitation curve.

FIG. 4 shows a speed limitation curve DBR in accordance with the invention. The reference symbol DBR1 denotes a first speed limitation curve, which is shifted on the x-axis by an offset speed nOFF from the speed set value nM(SL). The offset speed nOFF can be set by the operator of the installation. The speed regulation curve 16 corresponds to the falling linear segment of the speed limitation curve DBR1. In accordance with the invention, the first speed limitation curve DBR1 is shifted towards higher actual speeds (nM (IST) as a function of the speed set value nM(SL), which is preset by the operator. Consequently, the speed limitation curve moves with the speed set value. A correspondingly adjusted second speed limitation curve DBR2. is shown in FIG. 4 as a dot-dash line. The slope of the speed regulation curve 16 (points AB) of the speed limitation curve corresponds to the P-degree PGR.

Additionally, in the speed range above point B, the speed regulation curve 16 with the points AB can be extended to the x-axis, i.e., to a limit injection quantity qDBR of zero. This is shown in FIG. 4 by the line between the points B and E. In this regard, the speed nE associated with point E is greater than the sum of the speed set value nM(SL), the offset speed nOFF, and the product of the P-degree PGR and the rated speed nNENN. The limit injection quantity qDBR of the speed regulation curve 16 can be computed by the following equation $$qDBR=qV(\mathrm{MAX})-[((qV(\mathrm{MAX})-qV(\mathrm{MIN}))\cdot(nM(IST)-nM(SL)-n\mathrm{OFF}))/(PGR\cdot nNENN)]$$

in the range $$(nM(SL)+n\mathrm{OFF})\leqq nM(IST)\leqq(nM(SL)+n\mathrm{OFF}+(PGR\cdot nNENN)).$$

In a refinement of the invention, the slope of the speed regulation curve 16 can be preset by the operator. This is shown in FIG. 4 with a broken-line speed regulation curve between the two points A and C. In the speed range above point C, this speed regulation curve can likewise be extended to the x-axis, i.e., to a limit injection quantity qDBR of zero. This is shown in FIG. 4 by the line between the points C and F. In this regard, the speed nF associated with point F is greater than the sum of the speed set value nM(SL), the offset speed nOFF and a speed allowance dn. The limit injection quantity qDBR of the speed regulation curve 16 can be computed by the following equation $$qDBR=qV(\mathrm{MAX})-[((qV(\mathrm{MAX})-qV(\mathrm{MIN}))\cdot(nM(IST)-nM(SL)-n\mathrm{OFF}))/dn]$$

in the range $$(nM(SL)+n\mathrm{OFF})\leqq nM(IST)\leqq(nM(SL)+n\mathrm{OFF}+dn).$$

For the speed rate action dn, the relationship applies that dn is greater than zero and less than the product of the P-degree PGR and the rated speed nNENN. The speed rate action dn defines the steepness of the speed regulation curve and can be preset by the operator.

Figure 5:
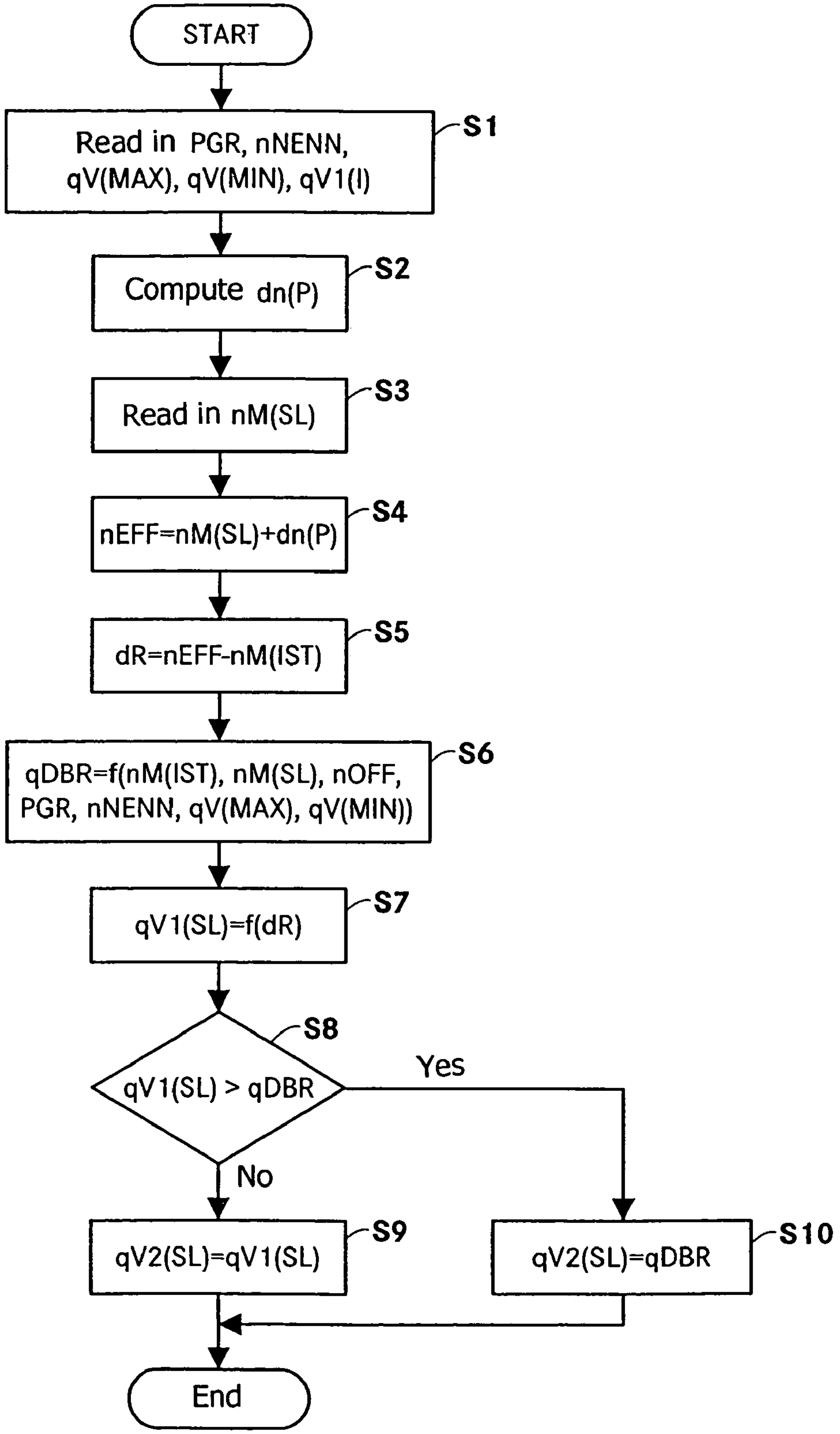
FIG. 5 shows a program flowchart.

FIG. 5 shows a program flowchart. At S1, the following variables are read in: the P-degree PGR, the rated speed nNENN, the maximum set injection quantity qV(MIN) and the I component (integral-action component) qV1(I) of the speed controller. The correction speed dn(P) is then computed at S2. After the speed set value nM(SL) has been read in at S3, the effective set speed nEFF is computed at S4. The speed control deviation is computed at S5. At S6, the current value of the limit injection quantity qDBR of the speed limitation curve DBR is computed. At S7, the first set injection quantity qV1(SL) is computed from the speed control deviation dR. Then, at S8, a test is performed to determine whether the first set injection quantity qV1(SL) is greater than the limit injection quantity qDBR of the speed limitation curve DBR. If this is the case, then, at S10, the second set injection quantity qV2(SL) is set to the value of the limit injection quantity qDBR. If this is not the case, then the second set injection quantity qV2(SL) is set to the value of the first set injection quantity qV1(SL). The program flowchart then ends.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for automatically controlling an internal combustion engine-generator unit, comprising the steps of: presetting a speed set value (nM(SL)) as a reference input; computing a first set injection quantity (qV1(SL)) by a speed controller substantially from the speed set value (nM(SL)) and an actual speed (nM(IST)); computing a limit injection quantity (qDBR) by means of a speed limitation curve (DBR); determining a second set injection quantity (qV2 (SL)) from the first set injection quantity (qV1(SL)) or the limit injection quantity (qDBR); and setting an operating point of the internal combustion engine-generator unit by means of the second set injection quantity (qV2(SL)), the speed limitation curve (DBR) being variable as a function of the speed set value (nM(SL)).

2. The method in accordance with claim 1, wherein an increase in the speed set value (nM(SL)) causes a shift in the speed limitation curve (DBR) towards higher actual speeds (nM(IST)).

3. The method in accordance with claim 2, further including varying a slope of a speed regulation curve of the speed limitation curve (DBR) by means of a P-degree (PGR).

4. The method in accordance with claim 3, wherein the speed regulation curve has a value of zero, and a limit injection quantity (qDBR) of zero is computed (qDBR=0) if the actual speed (nM(IST)) becomes greater than the sum of the speed set value (nM(SL)), an offset speed (nOFF), and the product of the P-degree (PGR) and a rated speed (nNENN).

5. The method in accordance with claim 4, wherein the speed regulation curve (16) and the limit injection quantity (qDBR) are computed by the following equation:

$$qDBR=qV(\mathrm{MAX})-[((qV(\mathrm{MAX})-qV(\mathrm{MIN}))\cdot(nM(IST)-nM(SL)-n\mathrm{OFF}))/(PGR\cdot nNENN)]$$

in the range $$(nM(SL)+n\mathrm{OFF})\leqq nM(IST)\leqq(nM(SL)+n\mathrm{OFF}+(PGR\cdot nNENN))$$

where qV(MAX)=maximum set injection quantity
qV(MIN)=minimum set injection quantity
nM(IST)=actual speed
nM(SL)=speed set value
nOFF=offset speed
PGR=P-degree
nNENN=rated speed.

6. The method in accordance with claim 2, wherein the slope of the speed regulation curve of the speed limitation curve (DBR) is freely selectable by an operator.

7. The method in accordance with claim 6, wherein the speed regulation curve has a value of zero, and a limit injection quantity (qDBR) of zero is computed (qDBR=0) if the actual speed (nM(IST)) becomes greater than the sum of the speed set value (nM(SL)), an offset speed (nOFF), and a speed allowance dn.

8. The method in accordance with claim 7, wherein the speed regulation curve and the limit injection quantity (qDBR) are computed by the following equation:

$$qDBR=qV(\mathrm{MAX})-[((qV(\mathrm{MAX})-qV(\mathrm{MIN}))\cdot(nM(IST)-nM(SL)-n\mathrm{OFF}))/dn]$$

in the range $$(nM(SL)+n\mathrm{OFF})\leqq nM(IST)\leqq(nM(SL)+n\mathrm{OFF}+dn)$$

where qV(MAX)=maximum set injection quantity
qV(MIN)=minimum set injection quantity
nM(IST)=actual speed
nM(SL)=speed set value
nOFF=offset speed
dn=speed rate action $$0<dn<PGR\cdot nNENN.$$

9. The method in accordance with claim 1, wherein the offset speed (nOFF) is freely selectable by an operator.

10. The method in accordance with claim 1, wherein the limit injection quantity (qDBR) corresponds to the maximum set injection quantity (qV(MAX)) if the actual speed (nM(IST)) becomes less than the sum of the speed set value (nM(SL)) and the offset speed (nOFF).

* * * * *